United States Patent
Mullett et al.

(10) Patent No.: US 10,882,376 B2
(45) Date of Patent: Jan. 5, 2021

(54) HEATING, VENTILATION, AND AIR CONDITIONING SYSTEM

(71) Applicants: DENSO International America, Inc., Southfield, MI (US); DENSO CORPORATION, Kariya (JP)

(72) Inventors: Reilly Mullett, Livonia, MI (US); Patrick Gannon, Wolverine Lake Village, MI (US); Hayato Asano, West Bloomfield, MI (US); Jonathon Goodfellow, Macomb, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 183 days.

(21) Appl. No.: 16/158,709

(22) Filed: Oct. 12, 2018

(65) Prior Publication Data
US 2019/0351729 A1 Nov. 21, 2019

Related U.S. Application Data

(60) Provisional application No. 62/671,468, filed on May 15, 2018.

(51) Int. Cl.
*B60H 1/00* (2006.01)

(52) U.S. Cl.
CPC ..... *B60H 1/00028* (2013.01); *B60H 1/00035* (2013.01); *B60H 1/00564* (2013.01); *B60H 2001/002* (2013.01); *B60H 2001/00085* (2013.01); *B60H 2001/00099* (2013.01); *B60H 2001/00114* (2013.01)

(58) Field of Classification Search
CPC ............ B60H 1/00514; B60H 1/00564; B60H 1/00028; B60H 1/0005; B60H 1/00035; B60H 1/00671; B60H 2001/00135; B60H 2001/002; B60H 2001/00085; B60H 2001/00107; B60H 2001/00721
See application file for complete search history.

(56) References Cited

U.S. PATENT DOCUMENTS

2002/0117296 A1* 8/2002 Smith ................ B60H 1/00028
165/202
2009/0250193 A1* 10/2009 Ishikawa ............ B60H 1/00028
165/61

(Continued)

*Primary Examiner* — Tho V Duong
(74) *Attorney, Agent, or Firm* — Harness, Dickey & Pierce, P.L.C.

(57) ABSTRACT

An HVAC system including a front blower having a first front blower outlet and a second front blower outlet. The first front blower outlet and the second front blower outlet are arranged vertically relative to one another. A joint duct includes a first body portion and a second body portion. The first body portion includes a first duct inlet, which is connected to the first front blower outlet, and a first duct outlet. The second body portion includes a second duct inlet, which is connected to the second front blower outlet, and a second duct outlet. The first duct outlet and the second duct outlet are arranged horizontally relative to one another. An HVAC case defines a first inlet and a second inlet arranged horizontally relative to one another. The first duct outlet is connected to the first inlet, and the second duct outlet is connected to the second inlet.

20 Claims, 4 Drawing Sheets

(56) References Cited

U.S. PATENT DOCUMENTS

| | | | |
|---|---|---|---|
| 2016/0039261 A1* | 2/2016 | Akahane | B60H 1/00528 |
| | | | 165/203 |
| 2016/0303941 A1* | 10/2016 | Kinmartin | F24F 1/022 |
| 2017/0096045 A1* | 4/2017 | Jung | B60H 1/00514 |
| 2017/0341484 A1* | 11/2017 | Santilli | B60H 1/00685 |
| 2018/0072131 A1* | 3/2018 | Lee | B60H 1/00678 |

* cited by examiner

HEATING, VENTILATION, AND AIR CONDITIONING SYSTEM

CROSS-REFERENCE TO RELATED APPLICATIONS

This application claims the benefit of U.S. Provisional Application No. 62/671,468, filed on May 15, 2018. The entire disclosure of the above application is incorporated herein by reference.

FIELD

The present disclosure relates to a heating, ventilation, and air conditioning (HVAC) system, such as an HVAC system for a vehicle.

BACKGROUND

This section provides background information related to the present disclosure, which is not necessarily prior art.

Some vehicle heating, ventilation, and air conditioning (HVAC) assemblies provide two-layer airflow, which directs recirculated air to foot outlets of the passenger cabin, and directs only fresh air to defrost outlets. As a result, vehicle warmup time is improved, as is the overall efficiency of the system. Furthermore, providing fresh air to the defrost outlets reduces or eliminates window fogging. While such two-layer HVAC assemblies are suitable for their intended use, they are subject to improvement. The present disclosure advantageously provides for an improved HVAC system that is more efficient and less complex as compared to current HVAC systems. One skilled in the art will appreciate that the present disclosure provides for numerous additional advantages and unexpected results in addition to those set forth herein.

SUMMARY

This section provides a general summary of the disclosure, and is not a comprehensive disclosure of its full scope or all of its features.

The present disclosure includes a heating, ventilation, and air conditioning (HVAC) system for a vehicle. The HVAC system includes a front blower having a first front blower outlet and a second front blower outlet. The first front blower outlet and the second front blower outlet are arranged vertically relative to one another. A joint duct includes a first body portion and a second body portion. The first body portion includes a first duct inlet connected to the first front blower outlet and has a first duct outlet. The second body portion includes a second duct inlet connected to the second front blower outlet and has a second duct outlet. The first duct outlet and the second duct outlet are arranged horizontally relative to one another. An HVAC case includes a heater core. The HVAC case defines a first inlet and a second inlet arranged horizontally relative to one another. The first duct outlet is connected to the first inlet, and the second duct outlet is connected to the second inlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
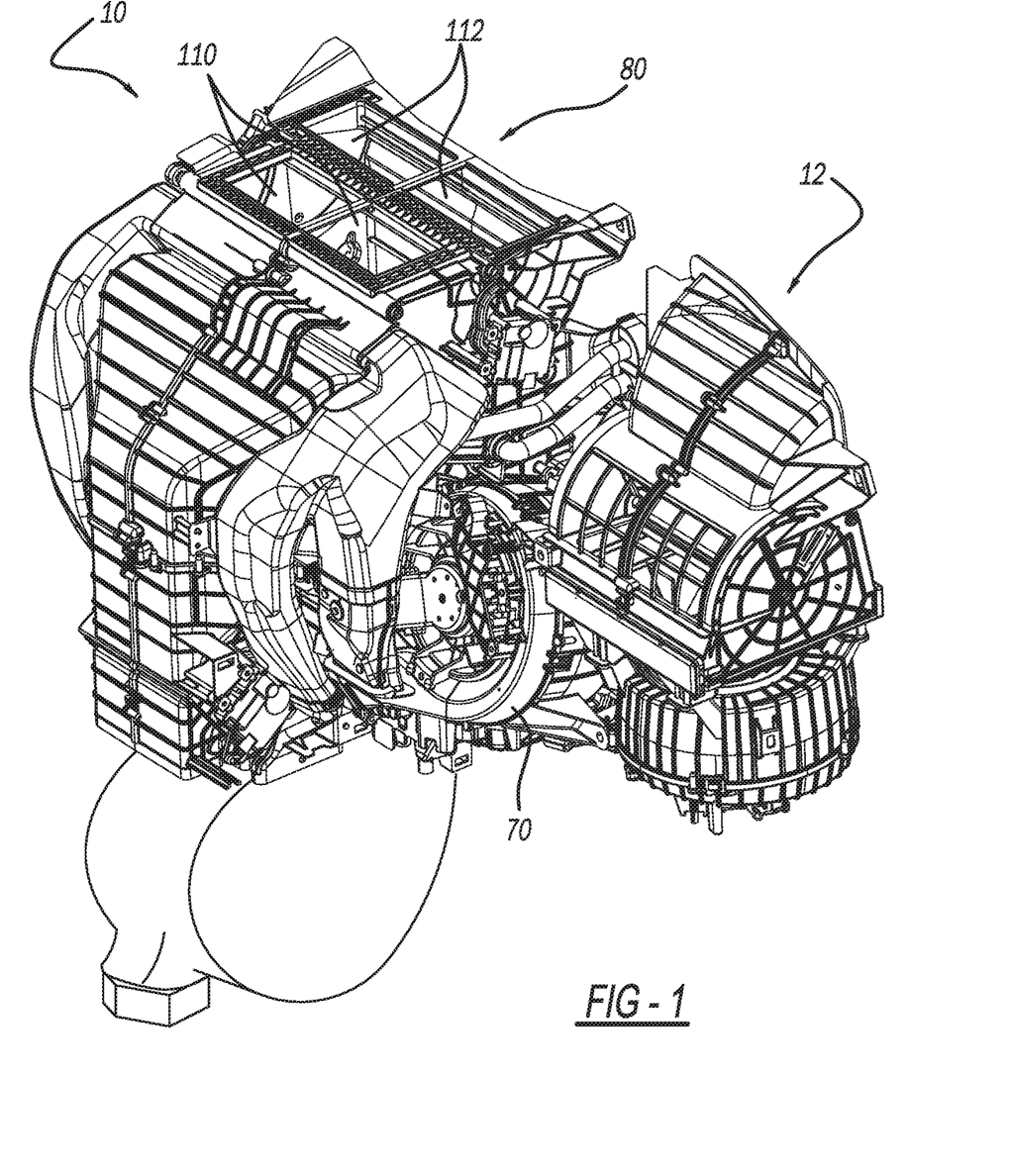
FIG. 1 is a perspective view of a heating, ventilation, and air conditioning (HVAC) system in accordance with the present disclosure.

FIG. 1 illustrates a heating, ventilation, and air conditioning (HVAC) system 10 in accordance with the present disclosure. The HVAC system 10 may be a vehicle HVAC system, such as described in the examples herein. The HVAC system 10 may be configured for use with any suitable vehicle, such as any suitable passenger vehicle, mass transit vehicle, utility vehicle, commercial vehicle, construction vehicle/equipment, military vehicle/equipment, watercraft, aircraft, etc. The system 10 may also be used with any suitable non-vehicular application as well.

The HVAC system 10 generally includes a front blower 12, a rear blower 70, and an HVAC case 80. With continued reference to FIG. 1 and additional reference to FIG. 2A, the front blower 12 will now be described in additional detail. The front blower 12 includes any suitable airflow generating device, such as a rotor 20. The front blower 12 defines a fresh air inlet 22, which is arranged at any suitable location where fresh air (i.e., air external to the passenger cabin of the vehicle that the HVAC system 10 is installed in) is accessible in order for the rotor 20 to draw fresh air into the passenger cabin of the vehicle that the HVAC system 10 is installed in. The front blower 12 further defines a first recirculated air inlet 24 and a second recirculated air inlet 26. Each one of the first and second recirculated air inlets 24 and 26 is arranged at any suitable position within the vehicle to receive recirculated air from the passenger cabin. When activated, the rotor 20 draws air from the passenger cabin into the front blower 12 through the first and second recirculated air inlets 24 and 26. The activated rotor 20 also draws in fresh air through the fresh air inlet 22.

Figure 2A:
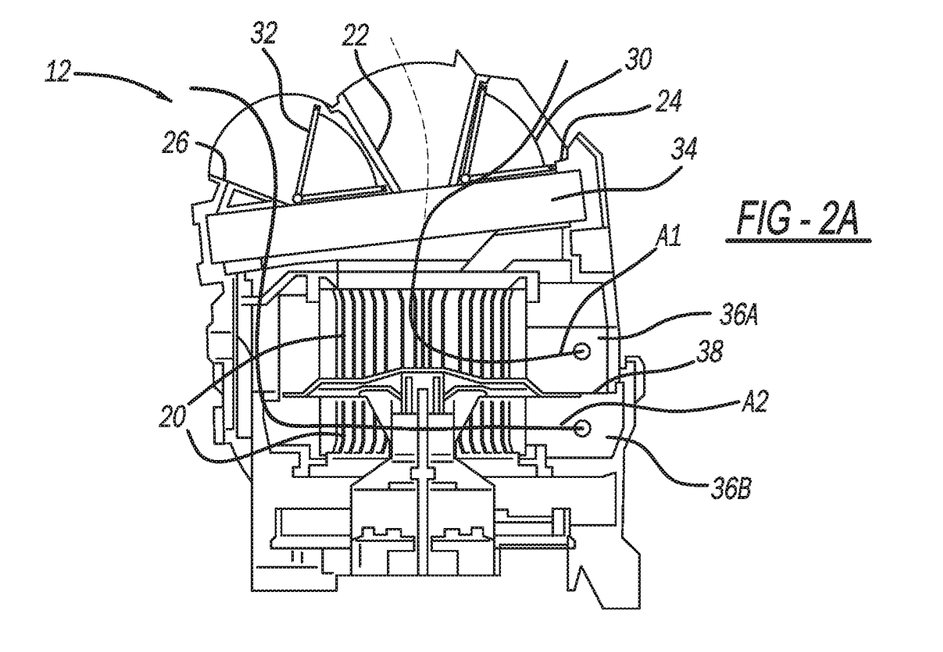
FIG. 2A is a cross-sectional view of a front blower of the HVAC system.

To control airflow into the front blower 12 through the fresh air inlet 22, the first recirculated air inlet 24, and the second recirculated air inlet 26, the front blower 12 further includes a first door 30 and a second door 32. The first and second doors 30 and 32 may be any suitable airflow control doors arranged at any suitable position to control airflow into the front blower 12. In the example illustrated, the first door 30 is a first rotary door movable between the fresh air inlet 22 and the first recirculated air inlet 24. The first door 30 is thus movable to allow airflow into the front blower 12 from only the first recirculated air inlet 24 (and thus bock the fresh air inlet 22), from only the first air inlet 22 (and thus block the first recirculated air inlet 24), or allow airflow into the front blower 12 simultaneously through both the fresh air inlet 22 and the first recirculated air inlet 24 when the first door 30 is moved to an intermediate position. The second door 32 can be any door suitable to control airflow through the second recirculated air inlet 26. For example and as illustrated, the second door 32 is any suitable rotary door movable to open the second recirculated air inlet 26 to any suitable degree, or close the second recirculated air inlet 26.

The front blower 12 includes a first blower outlet 36A and a second blower outlet 36B. The first and second blower outlets 36A and 36B are arranged vertically relative to one another, and separated by any suitable wall or other divider 38. Airflow A1 entering the front blower 12 through the fresh air inlet 22 and/or the first recirculated air inlet 24 exits the front blower 12 through the first outlet 36A. Airflow A2 entering the front blower 12 through the second recirculated air inlet 26 exits the front blower 12 through the second outlet 36B. The front blower 12 may further include a filter 34, which filters dust, dirt, and any other undesirable particulates from the air.

Figure 2B:
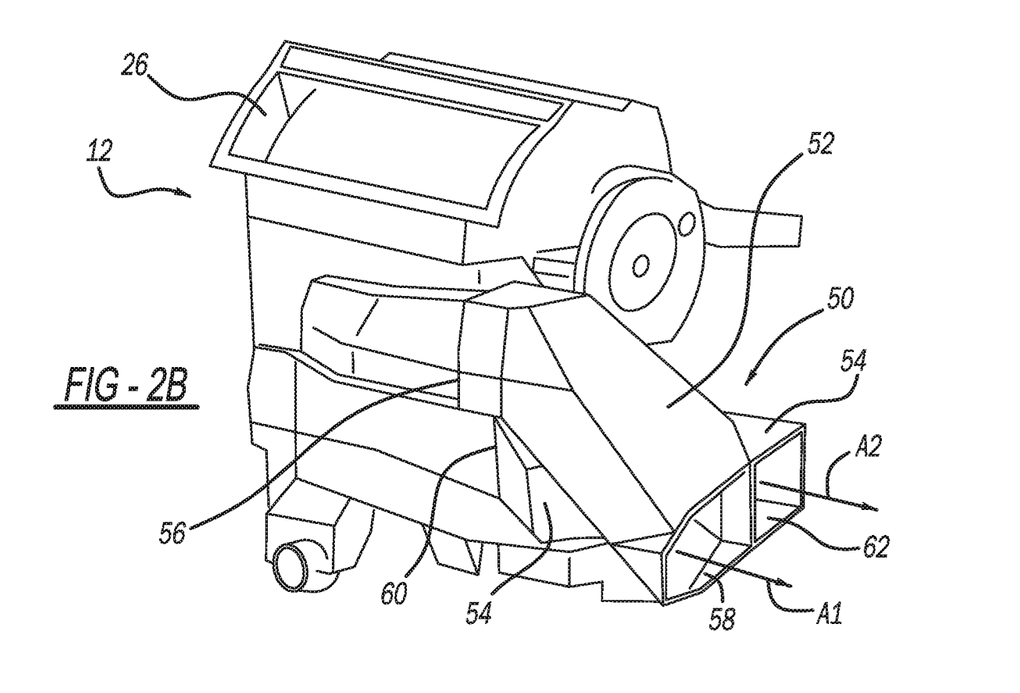
FIG. 2B is a perspective view of the front blower of FIG. 1.

With reference to FIG. 2B, the front blower 12 further includes a joint duct 50. The joint duct 50 includes a first body portion 52 and a second body portion 54. The first body portion 52 includes a first duct inlet 56 and a first duct outlet 58. The first duct inlet 56 is connected to the first blower outlet 36A. The second body portion 54 includes a second duct inlet 60 and a second duct outlet 62. The second duct inlet 60 is coupled to the second blower outlet 36B. The first duct outlet 58 and the second duct outlet 62 are arranged side by side in a common horizontal plane. Thus airflow A1 exiting the first blower outlet 36A flows through the first body portion 52 and exits the joint duct 50 through the first duct outlet 58. Airflow A2 exiting the second blower outlet 36B flows through the second body portion 54 and exits through the second duct outlet 62.

Figure 3:
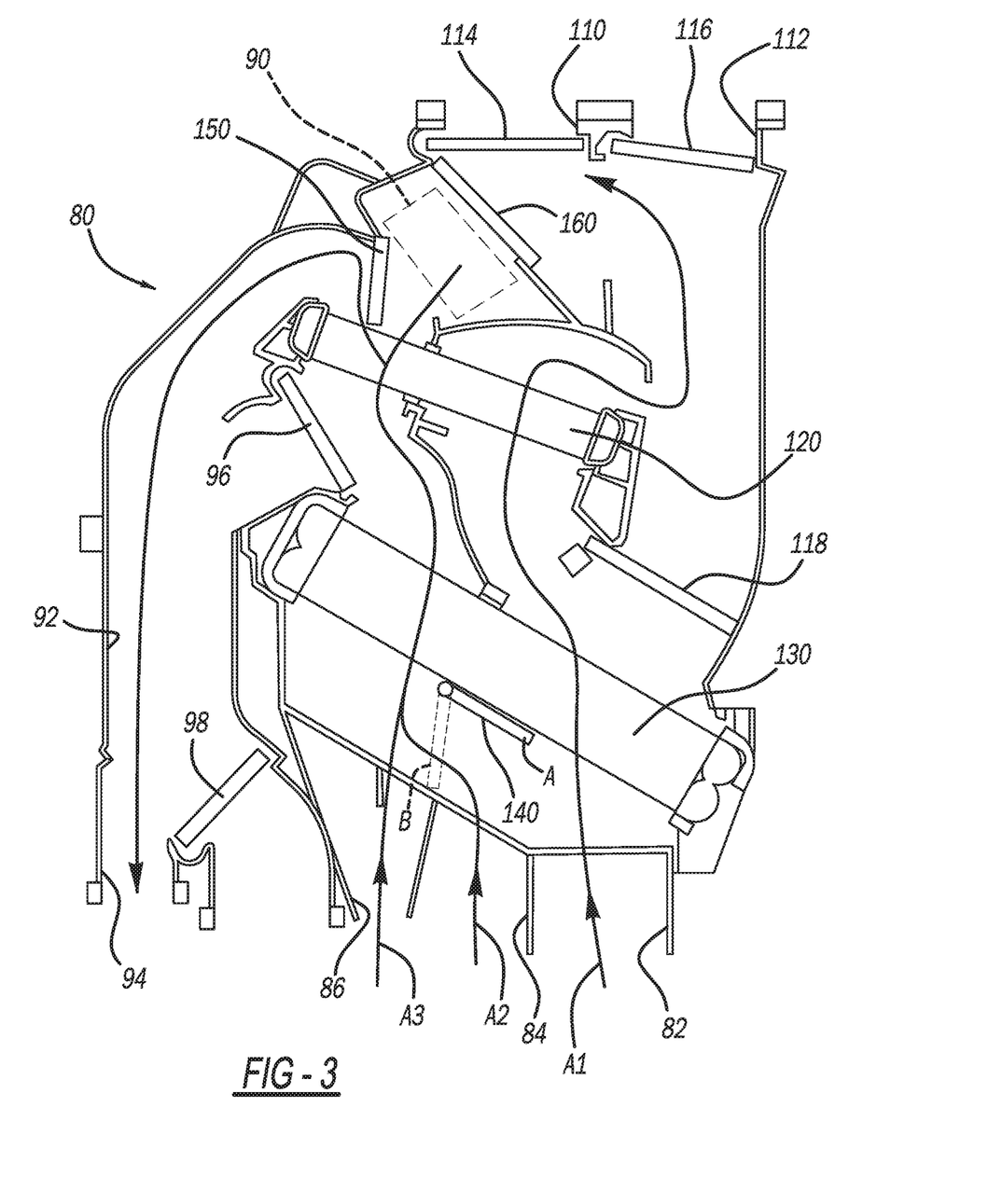
FIG. 3 is a cross-sectional view of an HVAC case of the HVAC system of FIG. 1, the HVAC case configured in a first passenger cabin warmup mode.

With additional reference to FIG. 3, the front blower 12 and the joint duct 50 thereof are connected to the HVAC case such that the first duct outlet 58 is connected to a first inlet 82 of the HVAC case 80, and the second duct outlet 62 is connected to a second inlet 84 of the HVAC case 80. The rear blower 70 is connected to a third inlet 86 of the HVAC case 80. The joint duct 50 thus advantageously allows the front blower 12 with the vertical outlets 36A and 36B to couple with (and feed airflow into) the HVAC case 80 having horizontally arranged inlets 82, 84, and 86. The rear blower 70 is any suitable airflow generator arranged and configured to draw airflow into the rear blower 40 from the passenger cabin of the vehicle that the HVAC system 10 is installed in. The rear blower 40 directs the recirculated airflow from the passenger cabin into the HVAC case 80 through the third inlet 86.

With continued reference to FIG. 3, the HVAC case 80 further defines a front foot outlet 90. The front foot outlet 90 is arranged such that airflow exiting the HVAC case 80 through the front foot outlet 90 flows to a foot area (i.e., floor area) of a front portion of the passenger cabin. The HVAC case 80 further defines a rear airflow path 92, which directs airflow to a rear foot outlet 94. The rear foot outlet 94 is arranged to direct airflow to a rear of the vehicle, specifically to a foot area (i.e., floor area) of a rear of the passenger cabin. The HVAC case 80 also includes a first rear airflow control door 96 and a second rear airflow control door 98, which can be any suitable airflow control doors for controlling airflow into and out of the rear airflow path 92.

The HVAC case 80 also defines a front defrost outlet 110 and a front vent 112. The front defrost outlet 110 is arranged to direct airflow out from within the HVAC case 80 to a windshield of the vehicle in order to defrost the windshield. The front vent 112 provides vented airflow to the passenger cabin, such as towards the faces of individuals seated at a front of the passenger cabin. Airflow through the front defrost outlet 110 is controlled by any suitable defrost airflow control door 114, and airflow through the front vent 112 is controlled by any suitable vent airflow control door 116. Airflow control door 118 may also be included to control airflow in the direction of the front defrost outlet 110 and the front vent 112.

The HVAC case 80 also includes a heater core 120. The heater core 120 is arranged in the airflow path of: airflow A1 flowing into the HVAC case 80 through the first inlet 82 from the front blower 12; airflow A2 generated by the front blower 12 and entering the HVAC case 80 through the second inlet 84; and airflow A3 flowing into the HVAC case 80 through the third inlet 86 from the rear blower 70. The heater core 120 is any suitable heating device configured to heat the airflow A1, A2, and A3 when activated. The HVAC case 80 may also include an evaporator 130 arranged along the airflow A1, A2, and A3 to cool the airflow A1, A2, and A3 when the evaporator 130 is activated.

The HVAC case 80 further includes a first rear-front airflow control door 140, a second rear-front airflow control door 150, and a third rear-front airflow control door 160. The first rear-front airflow control door 140 is arranged within the HVAC case 80 between the second inlet 84 and the third inlet 86. The door 140 is movable between an open position A and a closed position B. In the open position A, airflow A2 (which will typically be recirculated airflow entering through the first recirculated air inlet 24 or a mixture of recirculated and fresh airflow from inlet 22 when the HVAC case 80 is configured in a passenger cabin warmup mode) is permitted by the door 140 to mix with airflow A3 (which is recirculated airflow generated by the rear blower 70). In the closed position B, the first rear-front airflow control door 140 prevents airflow A2 from mixing with airflow A3.

The second rear-front airflow control door 150 is arranged between the front foot outlet 90 and the rear airflow path 92 leading to the rear foot outlet 94. The rear-front airflow control door 150 is movable to direct the mixture of airflow A2 and A3 (which occurs when the door 140 is in the open position A) or unmixed airflow A3 (airflow A3 does not mix with airflow A2 when the door 140 is in the closed position B) through the front foot outlet 90, the rear foot outlet 94, or simultaneously through both the front foot outlet 90 and the rear foot outlet 94 based on the position of the rear-front airflow control door 150.

The third rear-front airflow control door 160 is arranged between the front foot outlet 90 and generally the front defrost outlet 110. The third rear-front airflow control door 160 is movable to the closed position of FIGS. 3 and 4 to restrict airflow A1 from flowing to the front foot outlet 90. The third rear-front airflow control door 160 is also movable to an open position in which airflow A1 is permitted to flow to and though the front foot outlet 90.

FIG. 3 illustrates the HVAC case 80 configured in a passenger cabin warmup mode. In the passenger cabin warmup mode of FIG. 3, the first rear-front airflow control door 150 is arranged in the open positon A to allow the front recirculated airflow A2 (or mixture of recirculated and fresh airflow A2) to mix with the airflow A3. Whether the airflow A2 is recirculated or a mixture of fresh and recirculated depends on the position of the door 30. The mixed airflow A2 and A3 flows across the evaporator 130 (which is optional), and across the heater core 120, which heats the mixture of airflow A2 and A3. The second rear-front airflow control door 150 is arranged in the illustrated intermediate position, which directs a portion of the mixed airflow A2 and A3 to flow through the front foot outlet 90 and a portion to flow through the rear foot outlet 94. The third rear-front airflow control door 160 is arranged in the closed position to prevent airflow A1 from flowing to the front foot outlet 90.

The passenger cabin warmup mode of FIG. 3 advantageously allows recirculated front airflow A2 to flow through the front foot outlet 90 to more quickly warm the front of the passenger cabin because the recirculated passenger cabin air will typically be warmer than outside fresh air under conditions when it is desirable to warm the passenger cabin. Also, the passenger cabin warmup mode of FIG. 3 only directs fresh airflow A1 to the defrost outlet 110, which advantageously increases the defrost airflow volume and reduces or eliminates windshield fogging. The passenger cabin warmup mode configuration of FIG. 2 is a true two-layer system in which fresh (or a mixture of fresh and recirculated) airflow A1 is directed to the defrost outlet 110, and only recirculated airflow A2 and A3 is directed to the front foot outlet 90 and the rear foot outlet 94.

Figure 4:
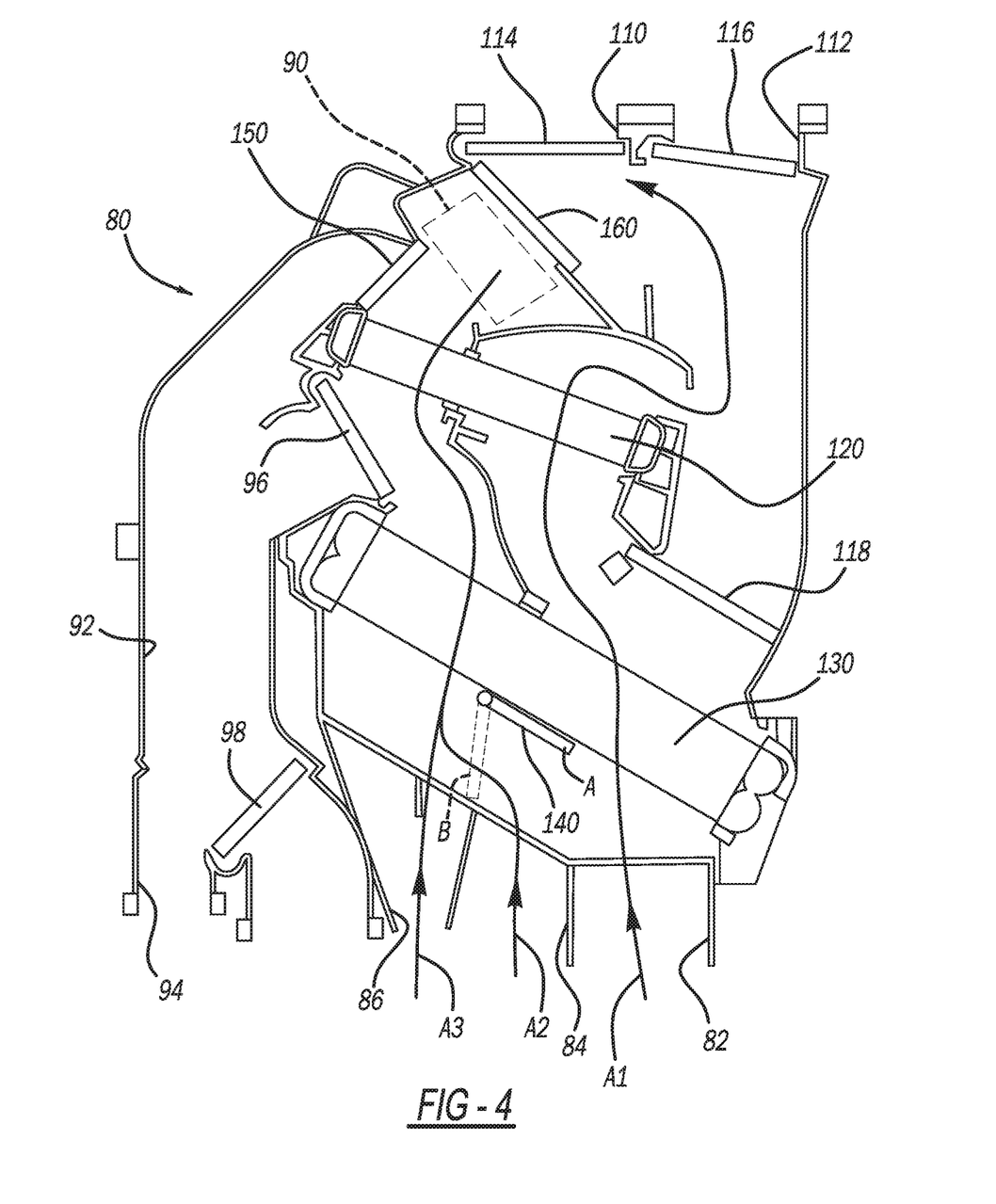
FIG. 4 is similar to FIG. 3, but with the HVAC case configured in a second passenger cabin warmup mode.

FIG. 4 illustrates another passenger cabin warmup mode of the HVAC case 80. The mode of FIG. 4 is similar to the mode of FIG. 3, except that the second rear-front airflow control door 150 is rotated from the intermediate position of FIG. 3 to the position of FIG. 4. When in the position of FIG. 4, the rear-front airflow control door 150 directs all of the mixed airflow A2 and A3 to the front foot outlet 90, and restricts airflow from flowing through the rear foot outlet 94. Thus the mode of FIG. 4 advantageously directs additional airflow through the front foot outlet 90 to reduce the warmup time for the passenger cabin.

In a normal operating mode (i.e., passenger cabin non-warmup mode) the first rear-front airflow control door 140 is moved to the closed position B to prevent airflow A2 and A3 from mixing. Instead, airflow A1 and A2 mixes and flows across the evaporator 130 (which is optional) and the heater core 120 to the front defrost outlet 110 and the front vent 112. The second rear-front airflow control door 150 is moved to restrict airflow A3 from flowing to the front foot outlet 90. The other airflow control doors 96, 98, 122, 114, and 116 can be moved to any suitable positions, as known in the art, to provide various normal operating modes, such as a normal heating mode, a normal defrost mode, and a normal heating/defrost mode. In the normal defrost mode, the third rear-front airflow control door 160 restricts airflow A1 from flowing to the front foot outlet 90.

One skilled in the art will appreciate that the present disclose provides numerous additional advantages and unexpected results in addition to those set forth above. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system for a vehicle, the HVAC system comprising:
   a front blower including a first front blower outlet and a second front blower outlet, the first front blower outlet and the second front blower outlet are arranged vertically relative to one another;
   a joint duct including a first body portion and a second body portion, the first body portion includes a first duct inlet connected to the first front blower outlet and a first duct outlet, the second body portion includes a second duct inlet connected to the second front blower outlet and a second duct outlet, the first duct outlet and the second duct outlet are arranged horizontally relative to one another; and
   an HVAC case including a heater core, the HVAC case defining a first inlet and a second inlet arranged horizontally relative to one another, the first duct outlet is connected to the first inlet and the second duct outlet is connected to the second inlet.

2. The HVAC system of claim 1, further comprising a rear blower connected to a third inlet defined by the HVAC case.

3. The HVAC system of claim 2, wherein the first inlet, the second inlet, and the third inlet are all horizontally arranged relative to one another with the second inlet between the first inlet and the third inlet.

4. The HVAC system of claim 2, the HVAC case further includes a first rear-front airflow control door between the second inlet and the third inlet that is movable to direct recirculated airflow generated by the front blower that has entered the HVAC case through the second inlet to mix with recirculated airflow generated by the rear blower that has entered the HVAC case through the third inlet.

5. The HVAC system of claim 4, further defining a front foot outlet that directs airflow towards feet of occupants at a front of the vehicle, and defining a rear foot outlet that directs airflow from the rear blower towards a rear of the vehicle;
   wherein the HVAC case directs the mixed airflow towards the front foot outlet and the rear foot outlet.

6. The HVAC system of claim 5, the HVAC case further includes:
   a second rear-front airflow control door movable to direct airflow generated by the rear blower and heated by the heater core through the rear foot outlet, through the front foot outlet, or simultaneously through both the rear foot outlet and the front foot outlet; and
   a third rear-front airflow control door that is movable to control flow of fresh airflow generated by the front blower through the front foot outlet.

7. The HVAC system of claim 6, wherein the second rear-front airflow control door is between the rear foot outlet and the front foot outlet.

8. The HVAC system of claim 1, wherein the first front blower outlet and the second front blower outlet are separated by a divider wall therebetween.

9. The HVAC system of claim 1, wherein the front blower defines a first recirculated air inlet and a fresh air inlet, airflow that enters the front blower through the first recirculated air inlet and the fresh air inlet exits the front blower through the first front blower outlet; and
   wherein the front blower defines a second recirculated air inlet, airflow that enters the front blower through the second recirculated air inlet exits the front blower through the second blower outlet.

10. The HVAC system of claim 9, wherein in a passenger cabin warmup mode:
    the first rear-front airflow control door is positioned such that recirculated airflow generated by the front blower and entering through the second inlet mixes with recirculated airflow generated by the rear blower and entering through the third inlet, the HVAC case directs the mixed airflow through the heater core and to the second rear-front airflow control door;
    the second rear-front airflow control door is positioned such that some of the mixed airflow flows through the front foot outlet and some of the mixed airflow flows through the rear foot outlet; and
    the third rear-front airflow control door is positioned such that fresh airflow generated by the front blower and entering through the first inlet is blocked from flowing to the front foot outlet.

11. The HVAC system of claim 10, wherein in a passenger cabin warmup mode:
    the first rear-front airflow control door is positioned such that recirculated airflow generated by the front blower and entering through the second inlet mixes with recirculated airflow generated by the rear blower and entering through the third inlet, the HVAC case directs the mixed airflow through the heater core and to the second rear-front airflow control door; and
    the second rear-front airflow control door is positioned to close the rear foot outlet such that all of the mixed airflow flows through the front foot outlet and none of the mixed airflow flows through the rear foot outlet.

12. The HVAC system of claim 11, wherein in a passenger cabin non-warmup mode:
    the first rear-front airflow control door is positioned such that the first rear-front airflow control door separates airflow generated by the front blower and entering through the second inlet from recirculated airflow generated by the rear blower and entering through the third inlet; and
    the second rear-front airflow control door is positioned to prevent airflow generated by the front blower from flowing through the rear foot outlet.

13. A heating, ventilation, and air conditioning (HVAC) system for a vehicle, the HVAC system comprising:
    a rear blower;
    a front blower including a first front blower outlet and a second front blower outlet, the first front blower outlet and the second front blower outlet are arranged vertically relative to one another;
    a joint duct including a first body portion and a second body portion, the first body portion includes a first duct inlet connected to the first front blower outlet and a first duct outlet, the second body portion includes a second duct inlet connected to the second front blower outlet and a second duct outlet, the first duct outlet and the second duct outlet are arranged horizontally relative to one another; and
    an HVAC case including:
      a first inlet, a second inlet, and a third inlet arranged horizontally relative to one another, the first duct outlet is connected to the first inlet, the second duct outlet is connected to the second inlet, and the rear blower is connected to the third inlet;
      a heater core;
      a front foot outlet that directs airflow towards feet of occupants at a front of the vehicle;
      a defrost outlet that directs airflow to a windshield of the vehicle to defrost the windshield;

a rear foot outlet that directs airflow from the rear blower towards a rear of the vehicle;

a first rear-front airflow control door movable to direct recirculated airflow generated by the front blower that has entered the HVAC case through the second inlet to mix with recirculated airflow generated by the rear blower that has entered the HVAC case through the third inlet;

a second rear-front airflow control door movable to direct airflow generated by the rear blower and heated by the heater core through the rear foot outlet, through the front foot outlet, or simultaneously through both the rear foot outlet and the front foot outlet;

a third rear-front airflow control door that is movable to control flow of fresh airflow generated by the front blower through the front foot outlet.

14. The HVAC system of claim 13, wherein the first front blower outlet and the second front blower outlet are separated by a divider wall.

15. A heating, ventilation, and air conditioning (HVAC) system for a vehicle, the HVAC system comprising:

a front blower including a first front blower outlet and a second front blower outlet separated by a divider therebetween, the first front blower outlet and the second front blower outlet are arranged vertically relative to one another;

a rear blower;

an HVAC case defining a first front blower inlet, a second front blower inlet, a rear blower inlet, a front foot outlet, and a rear foot outlet;

a first rear-to-foot airflow control door between a second inlet and a third inlet that is movable to direct recirculated airflow generated by the front blower that has entered the HVAC case through the second inlet to mix with recirculated airflow generated by the rear blower that has entered the HVAC case through the third inlet; and a second rear-front airflow control door movable to direct airflow generated by the rear blower and heated by the heater core through the rear foot outlet, through the front foot outlet, or simultaneously through both the rear foot outlet and the front foot outlet.

16. The HVAC assembly of claim 15, wherein in a passenger cabin warmup mode:

the first rear-front airflow control door is positioned such that recirculated airflow generated by the front blower and entering through the second inlet mixes with recirculated airflow generated by the rear blower and entering through the third inlet, the HVAC case directs the mixed airflow through the heater core and to the second rear-front airflow control door; and the second rear-front airflow control door is positioned to direct some of the mixed airflow through the front foot outlet and some of the mixed airflow through the rear foot outlet.

17. The HVAC assembly of claim 15, wherein in a passenger cabin warmup mode:

the first rear-front airflow control door is positioned such that recirculated airflow generated by the front blower and entering through the second inlet mixes with recirculated airflow generated by the rear blower and entering through the third inlet, the HVAC case directs the mixed airflow through the heater core and to the second rear-front airflow control door; and the second rear-front airflow control door is positioned to close the rear foot outlet such that all of the mixed airflow flows through the front foot outlet and none of the mixed airflow flows through the rear foot outlet.

18. The HVAC assembly of claim 15, wherein in a passenger cabin non-warmup mode:

the first rear-front airflow control door is positioned such that the first rear-front airflow control door separates airflow generated by the front blower and entering through the second inlet from recirculated airflow generated by the rear blower and entering through the third inlet; and the second rear-front airflow control door is positioned to prevent airflow generated by the front blower from flowing through the rear foot outlet.

19. The HVAC assembly of claim 15, wherein the second rear-front airflow control door is between the rear foot outlet and the front foot outlet.

20. The HVAC assembly of claim 15, wherein the first inlet, the second inlet, and the third inlet are arranged horizontal to one another.

* * * * *